(12) United States Patent
Wardell et al.

(10) Patent No.: US 11,449,980 B2
(45) Date of Patent: Sep. 20, 2022

(54) SYSTEM AND METHOD FOR COMBINED AUTOMATIC AND MANUAL INSPECTION

(71) Applicant: ATS AUTOMATION TOOLING SYSTEMS INC., Cambridge (CA)

(72) Inventors: Steven Donald Wardell, Cambridge (CA); Daniel Blair De Verteuil, Cambridge (CA)

( * ) Notice: Subject to any disclaimer, the term of this patent is extended or adjusted under 35 U.S.C. 154(b) by 0 days.

(21) Appl. No.: 16/316,058

(22) PCT Filed: Jul. 10, 2017

(86) PCT No.: PCT/CA2017/050835
§ 371 (c)(1),
(2) Date: Jan. 8, 2019

(87) PCT Pub. No.: WO2018/006180
PCT Pub. Date: Jan. 11, 2018

(65) Prior Publication Data
US 2019/0164270 A1 May 30, 2019

Related U.S. Application Data

(60) Provisional application No. 62/359,920, filed on Jul. 8, 2016.

(51) Int. Cl.
*G06T 7/00* (2017.01)
*G01N 21/88* (2006.01)
(Continued)

(52) U.S. Cl.
CPC .............. *G06T 7/001* (2013.01); *G01N 21/88* (2013.01); *G06N 20/00* (2019.01); *G06T 5/50* (2013.01);
(Continued)

(58) Field of Classification Search
CPC ......... G06T 7/001; G06T 7/0004; G06T 5/50; G06T 2207/30108; G06T 2207/10024; G09B 7/06; G01N 21/88; G06N 20/00
See application file for complete search history.

(56) References Cited

U.S. PATENT DOCUMENTS 6,408,429 B1 6/2002 Marrion, Jr. et al.
6,567,162 B2 5/2003 Koren et al.
(Continued)

FOREIGN PATENT DOCUMENTS

EP 1770637 4/2007
WO WO 98/34095 8/1998
(Continued)

OTHER PUBLICATIONS

Canadian Intellectual Property Office as International Searching Authority, International Search Report and Written Opinion received on corresponding International Application No. PCT/CA2017/050835, dated Sep. 28, 2017.
(Continued)

*Primary Examiner* — Brenda C Bernardi
(74) *Attorney, Agent, or Firm* — Neil W. Henderson; Amarok IP Inc.

(57) ABSTRACT

A method for inspecting a part in a manufacturing environment, the method including: acquiring at least one image of the part; optionally enhancing the at least one image; automatically analyzing the enhanced image to determine if the part has a potential defect; if it is determined that there is a potential defect: displaying the at least one image to an operator; and receiving operator input of a part status, wherein the part status may be defect or no defect; and storing the part status in association with the at least one image. The automatic analysis may include a confidence
(Continued)

level and only images having a confidence level that does not meet a threshold will be displayed to an operator.

20 Claims, 12 Drawing Sheets

(51) Int. Cl.
G09B 7/06 (2006.01)
G06N 20/00 (2019.01)
G06T 5/50 (2006.01)

(52) U.S. Cl.
CPC ...... *G09B 7/06* (2013.01); *G06T 2207/10024* (2013.01); *G06T 2207/30108* (2013.01)

(56) References Cited

U.S. PATENT DOCUMENTS

| | | | |
|---|---|---|---|
| 7,002,462 B2 | 2/2006 | Welch | |
| 7,275,005 B2 | 9/2007 | Baba et al. | |
| 7,440,605 B2* | 10/2008 | Sasa | G01N 21/9501 382/141 |
| 8,121,397 B2* | 2/2012 | Harada | G06K 9/033 382/145 |
| 2003/0043369 A1 | 3/2003 | Smith | |
| 2004/0183900 A1 | 9/2004 | Karpen et al. | |
| 2006/0114525 A1* | 6/2006 | Yoo | H04N 17/04 358/504 |
| 2006/0222234 A1* | 10/2006 | Gaukroger | G06T 7/0004 382/145 |
| 2007/0172155 A1* | 7/2007 | Guckenberger | G06F 16/583 382/305 |
| 2009/0097737 A1* | 4/2009 | Hashimoto | G06K 9/209 382/145 |
| 2009/0116727 A1* | 5/2009 | Jin | G01N 21/9503 382/149 |
| 2010/0274406 A1* | 10/2010 | Miyazawa | G16H 40/63 700/295 |
| 2011/0222647 A1* | 9/2011 | Sugita | G01N 23/046 378/8 |
| 2012/0189189 A1 | 7/2012 | Doe et al. | |
| 2012/0209415 A1 | 8/2012 | Casanelles et al. | |
| 2013/0114878 A1* | 5/2013 | Scheid | G06T 7/001 382/141 |
| 2017/0178299 A1* | 6/2017 | Baek | G06T 7/136 |
| 2017/0323435 A1* | 11/2017 | Min | G06T 7/001 |
| 2018/0349633 A1* | 12/2018 | Takimoto | G06K 9/6215 |
| 2020/0073009 A1* | 3/2020 | Parikh | G06T 7/0004 |

FOREIGN PATENT DOCUMENTS

| | | |
|---|---|---|
| WO | 9901842 A | 1/1999 |
| WO | WO 99/16010 | 4/1999 |
| WO | WO 2004/083901 | 9/2004 |

OTHER PUBLICATIONS

European Patent Office, Office Action received on corresponding European Patent Application No. 17 823 384.7, dated Dec. 11, 2019.
Wikipedia contributors, "Simulation," Wikipedia, The Free Encyclopedia, Jul. 7, 2016, https://en.wikipedia.org/w/index.php?title=Simulation&oldid=728786111#Simulation_in_education_and_training, accessed on Aug. 22, 2017, printed on Jan. 13, 2020.
Wikipedia Contributors, "Training", Wikipedia, The Free Encyclopedia, Jun. 4, 2016, https://en.wikipedia.org/w/index.php?title=Training&oldid=723629995, accessed on Aug. 22, 2017, printed on Jan. 13, 2020.
Wikipedia Contributors, "Training Simulation", Wikipedia, The Free Encyclopedia, May 16, 2016, https://en.wikipedia.org/w/index.php?title=Training_simulation&oldid=720607774, accessed on Aug. 22, 2017, printed from https://en.wikipedia.org/wiki/Training_simulation on Jan. 13, 2020.
Real-time Test Algorithm for Image Sequence Midpoint Object, Song Shao Jing, pp. 50-54, Journal of Shanghai Polytechnic University, vol. 31, Issue No. 1, Mar. 31, 2014.
Nondestructive Detection Technique for Mining Conveyor, Qiao Tie Zhu, pp. 126-129, National Defense Industry Press, Jun. 30, 2015.
European Extended Search Report, European Patent Office, corrresponding European Application No. 17823384.7, dated Apr. 20, 2020.
European Extended Search Report, European Patent Office, corrresponding European Application No. 17823384.7, dated Jul. 3, 2020.
Office Action, State Intellectual Property Office of China, corresponding Chinese Application No. 202109082371840, dated Feb. 8, 2021.
Office Action, State Intellectual Property Office of China, corresponding Chinese Application No. 202109082371840, dated Sep. 13, 2021.
Automatic PCB Inspection Algorithms: A Survey, Madhav Mganti et al., pp. 287-313, Computer Vision and Image Understanding, vol. 63. No. 2, Mar. 7, 1996.

\* cited by examiner

Operator training & certification

| Training & certification |
|---|

Test sample Set          Operator response

SYSTEM AND METHOD FOR COMBINED AUTOMATIC AND MANUAL INSPECTION

REFERENCE TO RELATED APPLICATION(S)

This application is a formal application based on and claiming the benefit of U.S. provisional application No. 62/359,920, filed Jul. 8, 2016, which is hereby incorporated herein by reference.

FIELD

This disclosure relates to the inspection of items in a manufacturing or industrial environment, and in particular, the present application relates to a combined automatic and human/manual ("hybrid") inspection system and method.

INTRODUCTION

Inspection of parts in a manufacturing or industrial environment has typically involved manual inspection of the part. The manual inspection may be carried out at, for example, an inspection station within the manufacturing environment or may occur while the part is at an assembly station, on a conveyor, at some other point in the manufacturing process or the like. Generally speaking, the term "part" or "parts" may refer to a finished product, to an element of a finished product, or to any item subject to inspection.

Conventionally, in a manufacturing example, operators or inspectors, may inspect parts as they move along a conveyor in between processing stations on an assembly line. n some cases, operators may manipulate the parts, such as by manually lifting or agitating the parts or containers holding the parts, during inspection. In this document, "manual inspection" refers to inspection by a human, whether or not part is actually handled by a human operator. Operators will generally then remove or otherwise flag parts that are deemed defective.

Manual inspection generally relies on the level of the operator's skills and the operator's attention to detail as well as other variables. Further, human inspector's can be expensive in some situations. As such, some manufacturing environments have moved to the use of automated inspection systems that provide for inspections that do not rely on a manual inspection. Automatic, or automated, systems can often require significant development costs and may include a risk of lower accuracy than manual inspection and, thus, can result in false rejections.

As such, there is a need for an improved system or method for inspection of parts and other items.

The disclosure is directed at a method and system for hybrid inspection of parts preferably within a manufacturing or industrial environment or setting. Generally speaking, the method and system include image acquisition, image processing and, in predetermined circumstances, image presentation to human operators for reject determination.

According to one aspect herein, there is provided a method for inspecting a part in a manufacturing environment, the method including: acquiring at least one image of the part; optionally enhancing the at least one image; analyzing the enhanced image to determine if the part has a potential defect; if it is determined that there is a potential defect: displaying the at least one image to an operator; and receiving operator input of a part status, wherein the part status may be defect or no defect; and storing the part status in association with the at least one image.

In one case, the analyzing the image to determine if the part has a potential defect may include: analyzing the image for known indicators of a potential defect; determining a confidence level associated with the analysis; and if the confidence level does not meet a predetermined threshold, determine that there is a potential defect, otherwise determine that there is no potential defect.

In a particular example, the determining the confidence level may include: reviewing previously stored part status results and associated previously stored images; determining whether the at least one image exhibits similar characteristics to the previously stored images that have a status of defect; and determining the confidence level based on a measure of how well the characteristics of the previously stored images that have a status of defect match to characteristics of the at least one image.

In another case, the method may further include if it is determined that there is not a potential defect, further enhancing the at least one image and repeating the analysis.

In yet another case, the analyzing the enhanced image to determine if the part has a potential defect may include applying machine learning to previous images and previous part status results associated with the previous images.

In still yet another case, the acquiring at least one image of a part may include acquiring a plurality of images of a part. In this case, each of the plurality of images may be an image taken from a different vantage point. Alternatively or in addition, enhancing the plurality of images may include enhancing each of the plurality of images using a different enhancement method or a plurality of enhancement methods. Further, in some examples, the plurality of images of a part may include time-lapsed images. If so, the time-lapsed images may be superimposed to create a single image.

In a further case, the displaying the image to an operator may include: transmitting the image via a network to a remote location; and displaying the image to the operator on a computing device at the remote location.

In a still further case, the operator may be a plurality of operators and the displaying the at least one image to an operator may involve displaying the at least one image to more than one of the plurality of operators. The displaying the at least one image to more than one of the plurality of operators may be done on a plurality of computer devices either in one location or distributed among a plurality of locations.

In yet a further case, the storing the part status in association with the at least one image may further include storing information related to the operator in association with the part status and the at least one image. In this case, the method may further include analyzing performance of the operator based on the stored part status, at least one image data and information related to the operator.

According to another aspect herein, there is provided a system for inspecting a part in a manufacturing environment, the system including: image equipment for acquiring at least one image of the part; an input/output system for selectively displaying the at least one image to an operator and for receiving operator input; a storage module for storing the at least one image and data related to the at least one image and the operator; and a processor for: analyzing the at least one image received by the image equipment to determine if the part has a potential defect and, if it is determined that there is a potential defect, setting a part status to defect and selectively displaying the at least one image to the operator via the input/output system; if the processor selectively displays the at least one image to the operator, receiving operator input of a part status, wherein the part status may be defect or no defect; and if the operator input is no defect, setting the part status to no defect; and storing the part status in association with the at least one image and data related to the operator in the database.

In a particular case, the selectively displaying the at least one image to the operator may include: analyzing the image for known indicators of a potential defect; determining a confidence level associated with the analysis; and if the confidence level does not meet a predetermined threshold displaying the at least one image to the operator. It will be understood that the predetermined threshold may be a higher limit or a lower limit and a confidence level above or below the predetermined threshold may be used.

According to yet another aspect herein, there is provided a method of combined automatic and manual inspection of a part including: obtaining at least one image of the part to be inspected; automatically analyzing the at least one image to determine an automatic status result; displaying the at least one image to an operator to determine a manual status result; and determining a status of the part based on at least one of the automatic status result and the manual status result.

In a particular case, the method may further include enhancing the at least one image of the part prior to displaying the at least one image of the part to the operator.

In another case, the method may further include, before displaying the at least one image, transferring the images to a remote location to be displayed to the operator.

According to yet another aspect herein, there is provided a method of training quality control operators, the method including: storing images of a plurality of parts having varying quality in association with experienced quality control results from a hybrid system including both automated results and experienced operators; displaying the images to a new quality control operator and receiving input of new quality control results from the new quality control operator; and comparing the new quality control results to the experienced quality control results and displaying the comparison to the new quality control operator.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the disclosure will now be described, by way of example only, with reference to the attached drawings, in which.

DETAILED DESCRIPTION

Figure 1:
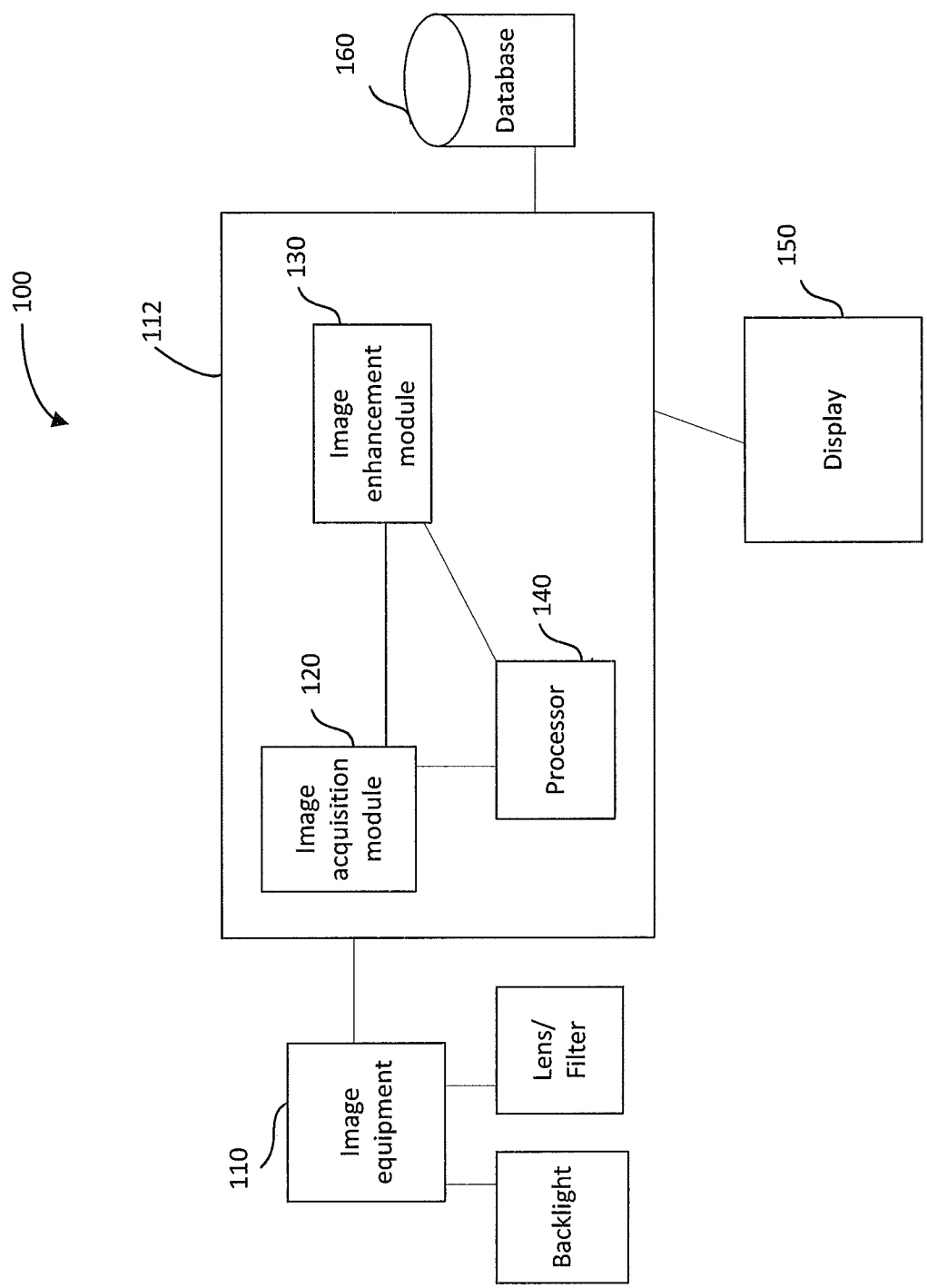
FIG. 1 illustrates an embodiment of a system for hybrid inspection.

The following description, with reference to the accompanying drawings, is provided to assist in understanding the example embodiments. The following description includes various specific details to assist in that understanding but these are to be regarded as merely examples. Accordingly, those of ordinary skill in the art will recognize that the various embodiments and changes and modifications thereto described herein can be modified without departing from the scope and spirit of the appended claims and their equivalents. In addition, descriptions of well-known functions and constructions may be omitted for clarity and conciseness.

The terms and words used in the following description and claims are not limited to their bibliographical meanings, but, are meant to be interpreted in context and used to enable a clear and consistent understanding.

Generally, the present disclosure provides a method and system for combined automatic and manual inspection of items (sometimes referred to as "hybrid inspection"). The method and system generally include image acquisition, image processing and image presentation to operators for reject determination.

In one embodiment, the system and method presented herein may bridge the gap between fully manual inspection systems and fully automated inspection systems. In some embodiments, the hybrid system and method approach of the disclosure enables the operator to be physically located remotely from the line. This can reduce or remove the need for an inspection operator to be physically in-line with the production equipment manufacturing the part.

The method and system use imaging equipment, for example, cameras or the like, to acquire images of the product, or part, for inspection. These images may be enhanced, tracked, and presented to remote inspection operators for determining a reject status of the part, or in other words, to confirm the determination of a rejected part by an automated inspection system. The images can also be used by an inspection operator to pass or reject a part. As such, operators no longer need to be near the part production equipment, or on-site, for the inspection process. Furthermore, operators do not have to work at full machine rates and/or do not limit the speed of the process because some inspection is automated and/or because inspection can be spread across inspectors.

As noted, the system and method of the disclosure has the advantage that the inspection load can be spread between multiple operators such that each operator can be given the time needed to properly assess the reject status and avoid false rejects. In some embodiments, operator capability may be tracked and analyzed and images may be stored and managed for historical and performance needs. In some embodiments, once in place, automated inspection can be applied to saved or stored images and may be validated versus actual operator determination. In some cases, this analysis can lead to the eventual replacement of an operator for reject determination or selection and aid in a shift from a fully manual inspection system to a fully automated inspection system providing the same or a similar level of accuracy.

In some embodiments, the system and method provided herein may provide commercial advantages such as, but not limited to, an increased level of feedback and control over current manual inspection systems; greater traceability of inspection results to part/product and process; and greater flexibility in the deployment of an operator workforce. The method may include a defined and manageable path for the implementation of automated inspection in a currently manual inspection environment.

FIG. 1 illustrates an embodiment of a system 100 for hybrid inspection. The system 100 includes image equipment 110, for example, at least one camera, to acquire images of at least one part to be inspected. The image equipment 110 is directed at parts in a manufacturing or assembly operation, for example, on a conveyor system (not shown). In some cases, a plurality of cameras may be used to acquire multiple images of the at least one part in various orientations. In some embodiments, the image equipment 110 may include lighting of various types or other optical devices to highlight the part or aspects thereof. For example, the imaging equipment 110 may include or be coupled with a light 115 (front or back lighting), lens/filter 116, or other physical image enhancers. This may provide the image equipment 110 or operators with a contrast between lit and unlit sections to highlight features of the parts being inspected.

The image equipment 110 transfers the acquired images to an image acquisition module 120 that may be located within a computing device 112, such as a local or a remote computer. The image acquisition module 120 may receive the images via a wireless or wired connection and when multiple images are transmitted, may determine the images to be displayed to the operator.

The image acquisition module 120 is operatively connected with an image enhancement module 130 and processor 140, both preferably integrated within the computing device 112, however, the modules 120 and 130 and the processor 140 may also be arranged in a distributed manner within different computing devices. The system 100 further includes a display 150 for displaying images to the operator. Although only one display 150 is shown, the system 100 may include multiple displays for multiple operators. As with other components, the display(s) may be connected or distributed on a network of the like. In some cases, the display 150 may be a touch screen and include pass and fail buttons to be touched by the operator.

The system 100 may further include a database 160 for storing images along with other information or data such as, but not limited to, operator input associated with the image or images. In some cases, the images and operator input may be reviewed in order to determine the accuracy of the operator. In some cases, data associated with the image and operator may also be stored, for example, enhancements made to the image, length of time the image was on the display 150, whether multiple operators viewed the image or the like.

In operation, the image enhancement module 130 may determine whether any enhancements are to be performed on the acquired images. Image enhancement may increase the likelihood of properly determining whether the part passes or fails the inspection. In some cases, suspect areas of the part may be highlighted within an image. In other cases, there may be color enhancements or edge enhancements performed to an image. In another embodiment, the image enhancement module 130 may cooperate with a physical image enhancer (e.g. a backlight 115 or lens 116), for example, through the use of various filtering and lighting techniques. In some cases, the image enhancement (determined by the image enhancement module 130) may be tailored to highlight difficult to detect defects within the part being inspected that could go undetected if viewed only by the human eye. In some cases, a plurality of images, each using one or a combination of filtering and lighting techniques (as determined by the image enhancement module 130) can be provided to the operator to provide information that may or would not otherwise be possible with a single image of the part. Any image enhancement determination, in the form of instructions, may be transmitted to the processor 140 that may then execute the instructions received from the image enhancement 130 or the image acquisition 120 modules.

In some embodiments, time lapsed images may be provided to the operator to illustrate a snapshot of defects that may be in motion, for example, a particle moving inside a fluid, or the like. In some cases, a plurality of time lapsed images of the particle in succession could be combined into a single image with enhancements indicating the path of the particle over the span of lapsed time.

The images, with enhancements if they were made, are transmitted to a display 150 to be viewed by an operator. The operator may determine, from the images presented on the display 150, whether the part has passed or failed the inspection. Alternatively or in addition, the operator may also be given options for further categorization of the pass or fail condition. Further categorization of the operator's decision or choice can be stored in the database along with any further information regarding the determination by either the automated inspection system or the operator.

For example, if the automated inspection of a part has determined that it is a PASS or GOOD part, the images may be displayed to the operator to perform further inspection to rate the part quality, for example an operator may provide input, in some cases, on a second screen of the display, indicating whether the part is marginal, satisfactory or excellent. In a similar manner, when a part is determined to be a FAIL or BAD part via automated inspection, further information may be input by the operator to correct an error or to indicate the reason for the reject status or failed selection. In one embodiment, the system may provide, such as via the display 150, a listing of options for the operator to select. For example, the system may provide on the display options such as, but not limited to, crack, missing, cosmetic, contaminants, or the like. In some cases, the operator may add further information to or about the image, such as a highlight of the defective area or include additional notes as to why the part has been passed/accepted or been failed/rejected.

In some cases, further metrics may also be collected by the system, for example, operator identification, date and time of image acquisition, date and time of operator viewing, product or part identification and/or serial number, batch information, automatically detected defects, defect location, camera identification, measured light levels of the image, image processing time, and the like. Performance of the automated system or the operator may also be assessed by reviewing this stored information.

Figure 2:
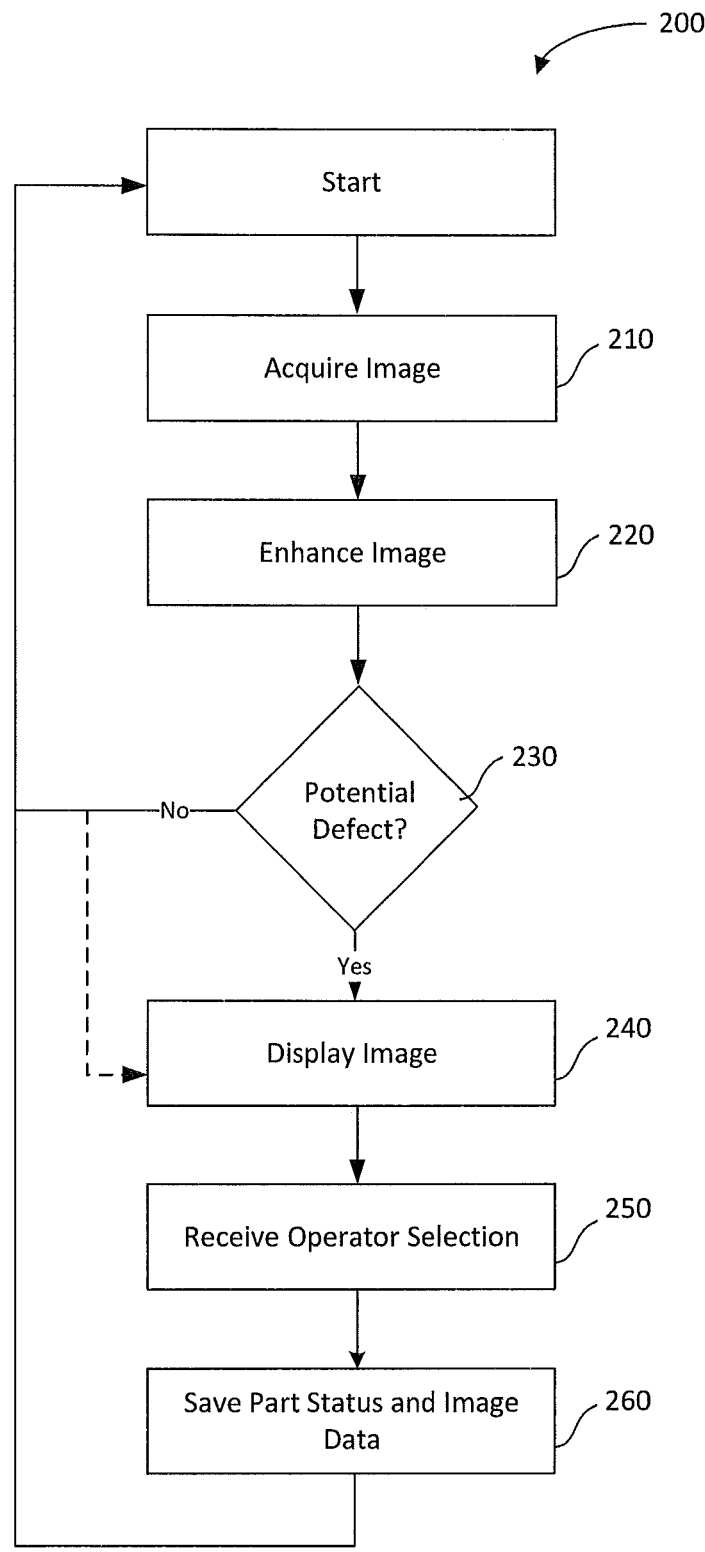
FIG. 2 is a flow chart illustrating an embodiment of a method for hybrid inspection.

FIG. 2 illustrates a method 200 for hybrid inspection. At 210, one or more images are acquired by the image equipment, for example, by one or more cameras aimed at a part/item on a conveyor or at a station along a manufacturing line. At 220, the image may be enhanced to provide further detail(s) or to highlight features or elements of the part within the image. In some embodiments, this may be performed by the image enhancement module 130 or performed by the processor 140 via a determination by and instructions from the image enhancement module 130.

At 230, the system may determine if there is a potential defect via an automated inspection process. If there is no defect determined, the part is generally accepted and the method returns to examine the next part. If the presence of a defect is determined, at 240, one or more images are then displayed to an operator to review and determine whether to accept or reject the part displayed in the image. In some cases, as shown by a dotted line in FIG. 2, a part that is considered not to have a defect may be displayed to the operator, for example, as a periodic or random check on the operation of the system, for training, or for other purposes. At 250, the system receives the operator's decision or determination and the part is processed accordingly. At 260, the operator's decision, image data and other data relevant or related to the part may be saved in the database. The method can then be restarted for the next part.

Figure 3:
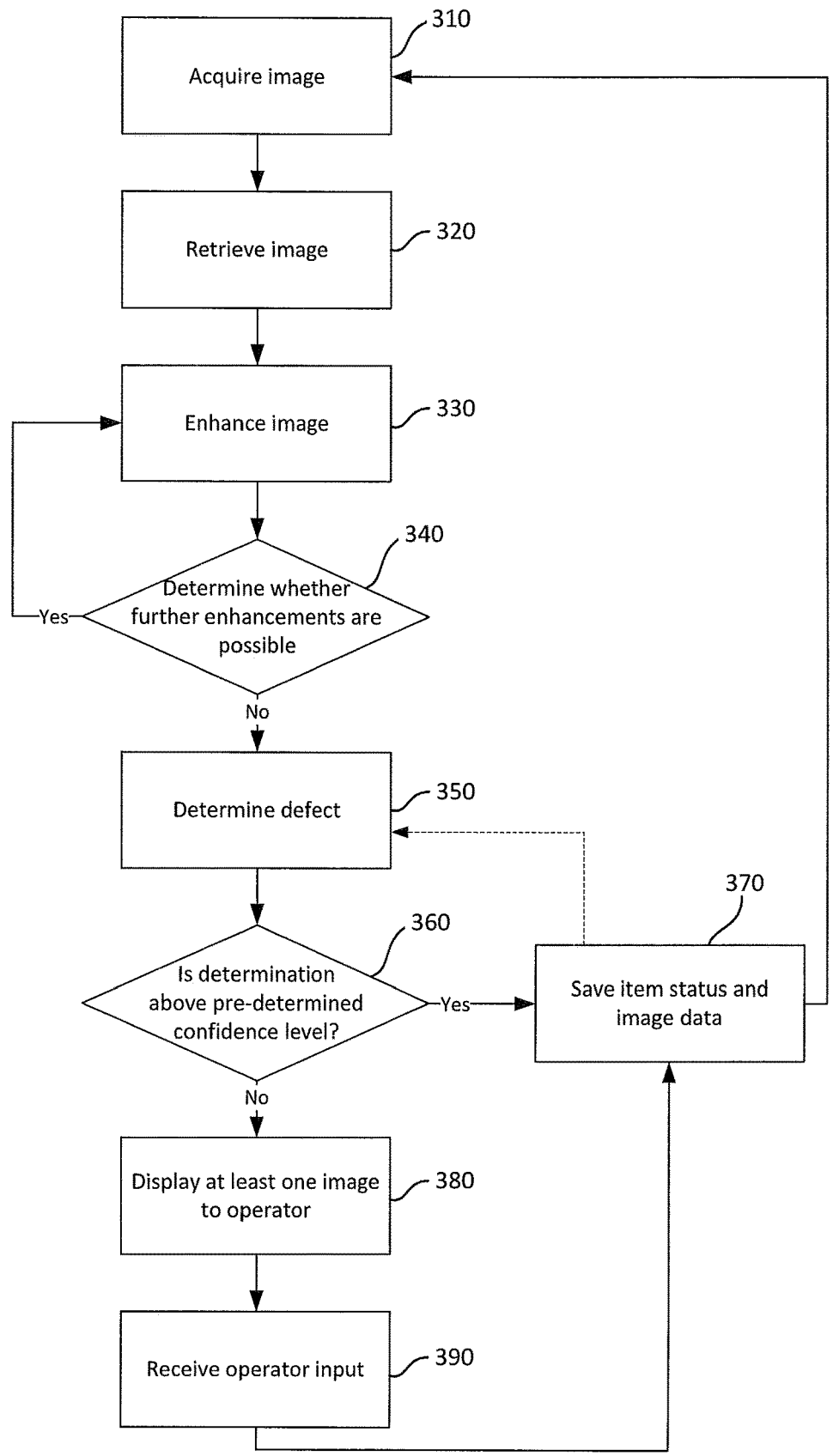
FIG. 3 is a flow chart illustrating another embodiment of a method for hybrid inspection.
Figure 4:
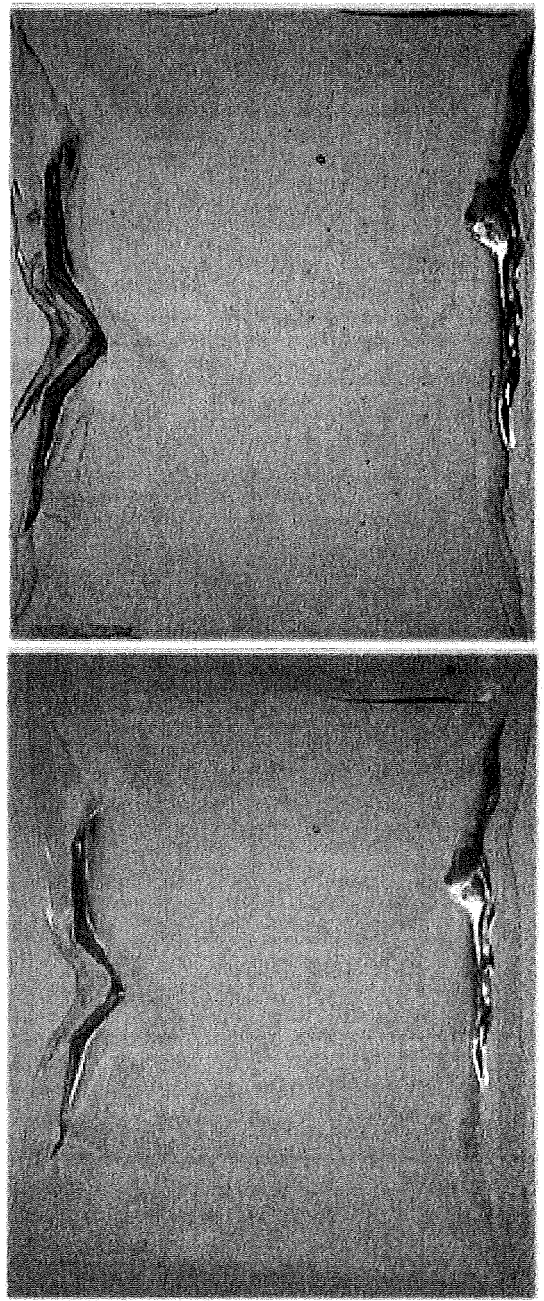
FIG. 4 illustrates image enhancement optionally provided by the system of FIG. 1.

FIG. 3 illustrates another embodiment of a method 300 for hybrid inspection. At 310, at least one image of a part or item on a conveyor, at a station on a manufacturing line, or the like, is acquired or captured by the image equipment. In some cases, a set of time lapsed images of the part or item may be acquired. The images are preferably stored in a memory component, such as the database 160 that is operatively connected to the image equipment 110. At 320, the system retrieves the image or images related to a specific part or item from the memory component. At 330, the image or images may be enhanced by the image enhancement module 130. Alternatively, the image enhancement module 130 may determine if enhancements are needed and then transmit instructions to the processor 140 to perform the enhancements, if necessary. The system, at 340, then determines whether further enhancements are possible for the image and would be beneficial or preferred. If further enhancements are possible and preferred, the image enhancement module 130 may provide further enhancements to the at least one image at 330. FIG. 4 illustrates an image and and enhanced image. In some cases, the operator may select whether to provide additional image enhancements. Alternative, a setup technician may initially configure or pre-load potential image enhancements.

If it is determined that no further enhancements are beneficial or preferred, the system may determine whether the part has a defect, at 350. The determination of whether or not there is a defect may be processed similarly to the process illustrated in FIG. 2 but in this case, there is a further check of the confidence level of the system.

At 360, the system makes a determination of the confidence or confidence level with regard to the determination of the status of the part. For example, the image can be processed for known defect indicators using automated image analysis tools and techniques. The amount by which these indicators show deviation from expected norms equates to the level of confidence that the image contains a defect. Using classical machine vision image analysis algorithms, discrete values for known defect indicators can be collected. If the aggregate scores of those values are deemed higher than acceptable limits, the image under inspection is deemed a defect. In the simplest of cases, if a region of the image as small as a single pixel is measured with an intensity value greater than a set limit, that may indicate a confidence level sufficient enough to mark the part as a defect. In complex inspections, several image analysis tools of varying type, position and complexity may be combined using a defined numerical algorithm to create an image score. A score greater than a set and agreed upon limit would also indicate a confidence level great enough to mark the image as a defect.

Confidence levels may also be dynamically determined through applying automated image analysis on previously stored images in the database(s) and measuring, or comparing the results from automated inspection versus results from manual inspection by an operator. As more and more image sets are created after being reviewed by an operator, increased testing of newly developed image processing methods can be run against these image sets to further refine confidence levels. In some embodiments, the tests may happen automatically offline from the inspection system itself. Once an image analysis technique is deemed acceptable to a high enough confidence level, the system 100 can be updated to deploy that technique and increase the number of images that become handled automatically which leads to a reduced number of images requiring operator review and may accelerate a move towards a fully automated system.

In some cases, the system may make a determination of the confidence level of the accept and/or reject status determined by automated inspection based on each image of the part. In some cases, the system may review an aggregated confidence level to determine a threshold confidence level. If the system determines that at least one confidence level is below a threshold, it will be determined that the decision of the part status is below the confidence level. For example, the system may be set such that all or almost all of the images are sent to an operator for review until it is determined that a smaller number of images may be sent, based on, for example, a confidence level of the automated system. For example, if the automated system is correct (as judged by an operator) most of the time, only parts/images with a lower confidence level need to be reviewed by the operator. As noted above with regard to FIG. 2, some images that would otherwise be acceptable may be reviewed by operators for various purposes.

In some cases, the determination of whether or not further enhancements to the image or images are possible or needed 340 may be performed after an initial determination of whether or not there is a defect 350.

If the confidence level is above a predetermined threshold, at 370 the status of the part is stored in connection with the image data. The system may then acquire the next image or images corresponding to a new part or item.

If, at 360, the confidence level is below a pre-determined threshold, the at least one image will be displayed to an operator at 380. At 390, the system receives operator input with respect to review of the image or images. The status of the part is determined from the operator input along with any additional information regarding the part that is entered by the operator. The status of the part, any additional information, and the image data is then stored by the system at 370 before returning to acquire the next image.

The stored information regarding part status and the images may be used as feedback to the determination of whether there is a defect or there is no defect at 350 (as schematically shown in dotted lines). In some cases, the method may repeat steps 380 and 390 with one or more additional operators for secondary review or confirmation of the manual inspection process. For example, secondary review could be useful during training.

Figure 5:
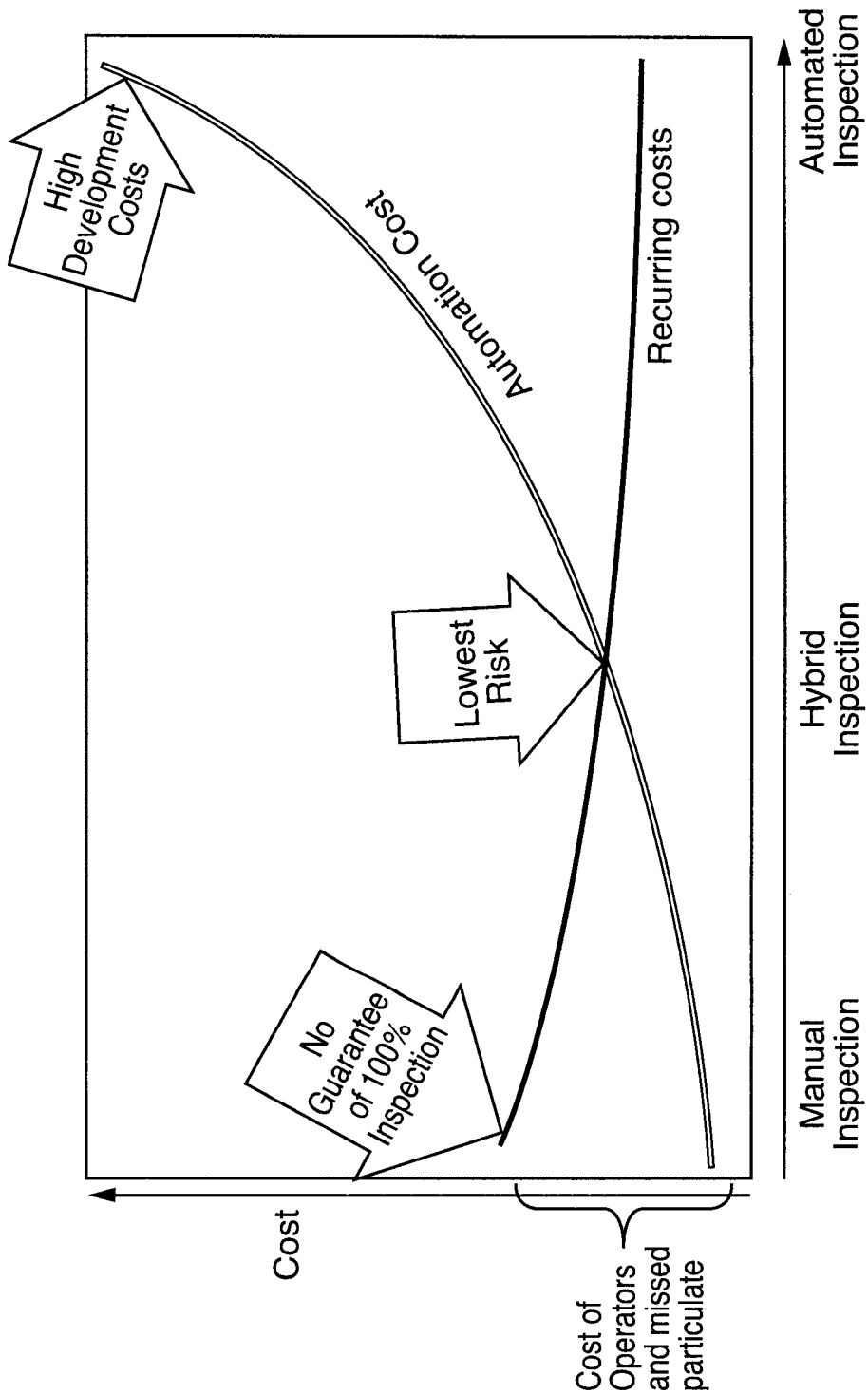
FIG. 5 illustrates a graph of manual inspection compared to automatic inspection.

The method and system disclosed herein can provide for a hybrid system that combines an operator's ability to find patterns with high-speed processing capabilities, tracking, and categorizing in a cost effective way to move toward a fully automated vision, or inspection, system. For example, the method and system of the disclosure may bring efficiencies, automated tracking and archival abilities to applications which are infeasible for solely automated/machine detection systems due to technical or cost reasons, such as illustrated in FIG. 5.

Figure 6:
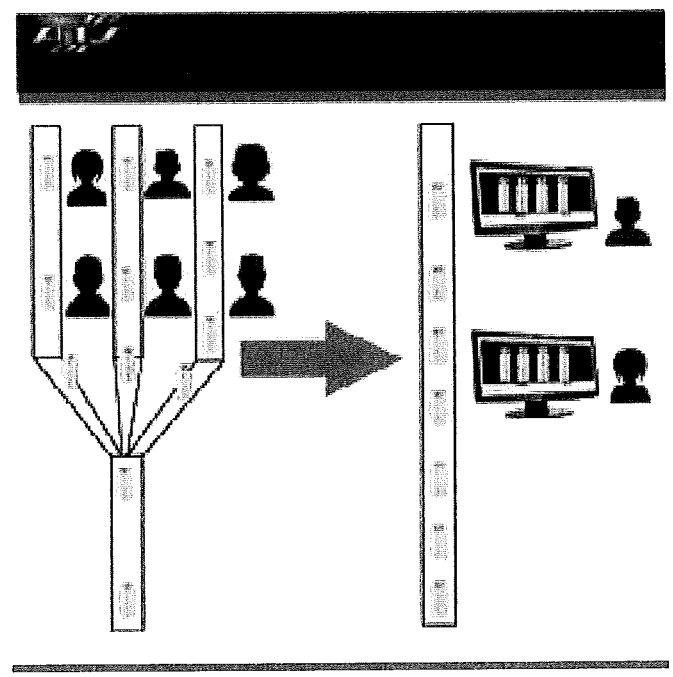
FIG. 6 illustrates an example of a possible configuration of an embodiment of a system for hybrid inspection.

In some embodiments, the system 100 may alternately be described as including various modules. For example, these modules may include an Image Acquisition module that captures or receives image(s) from inspection targets or image equipment; a Multiple Inspection Display module that organizes and arranges display of the acquired images to operators; a Processing Computer module that stores, enhances, and distributes images to the Inspection Display module; and a Database System module that stores and archives all or a subset of the images for future reference, for example, with a goal of automating using machine vision/automated inspection in the future. Operators, or inspectors, may be located at the manufacturing line, in a remote control room, or potentially at a separate facility to review the images generated by the system. In some embodiments, the system may include a plurality of computing devices for viewing of images. By using a plurality of computing devices, a greater number of operators may be able to view parts on demand and in a distributed manner as schematically shown in FIG. 6.

Figure 7:
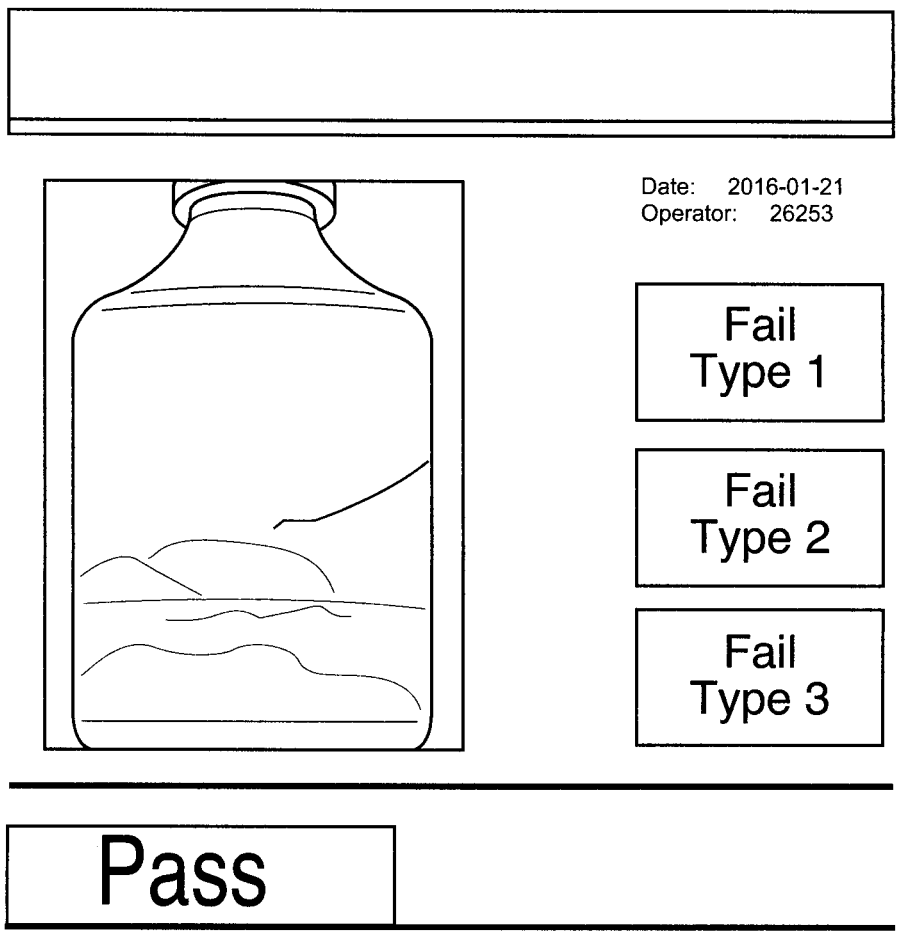
FIG. 7 illustrates an example pass/fail screen.

In operation of the embodiments described herein, an image that is ready for review is transmitted to one of the active display stations for presentation to an operator for pass or fail decision making. The actual review by an operator may be done in real-time or may be done at a different timing and/or off-line depending on the strategy needed in any particular circumstance. As noted herein, the pass/fail decision making may also include further detail with regard to the type of fail/error. For example, FIG. 7 shows a Pass/Fail with reason code screen. As shown in FIG. 7, the display may also show part statistics with regard to the processing. In order to track operators, each operator may log on to the system independently, for example, using unique access identifiers (IDs). As illustrated in FIG. 7, images may be encoded with the inspecting operator's ID or other data, part statistics, yield results or the like, before being stored into the database system so that this data can be later accessed. As such, the system may provide various statistics on any or all operators. As the system will be programmed to learn about defects when a part is rejected, over time the system may transition from using more manual inspection to using more automated inspection.

Figure 8:
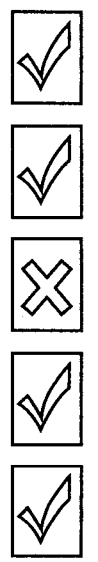
FIG. 8 illustrates an example operator training/certification report showing an operator's score.
Figure 8:
Figure 8:
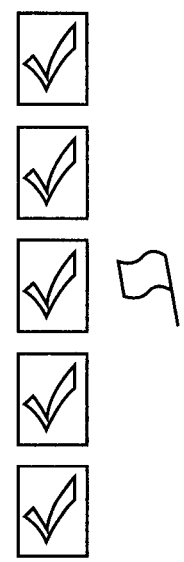

Since various data relating to the parts and images is stored, this data can also be used for training operators by playing back already classified data to a new operator to test their ability to match the already classified date. A schematic screenshot of an operator training and certification screen is shown in FIG. 8 which reflects information relating to the operator.

Figure 9:
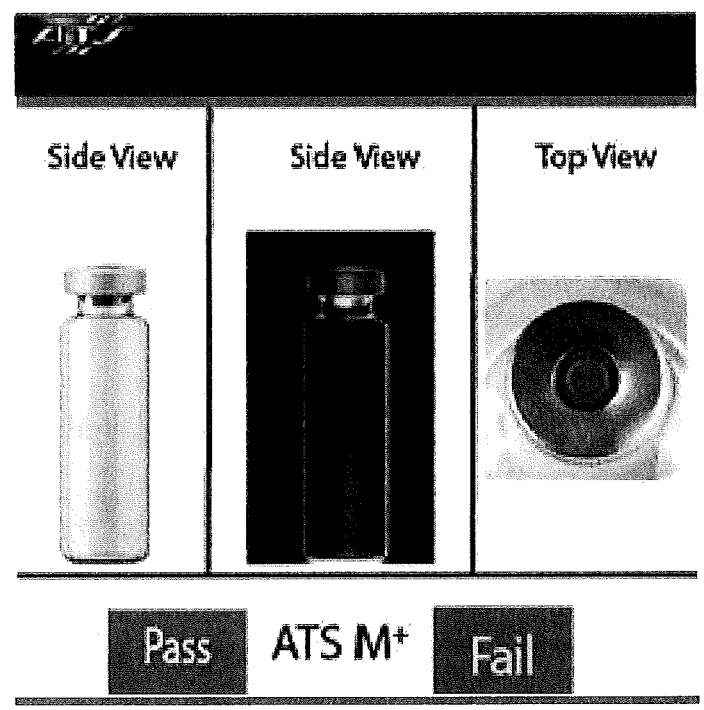
FIG. 9 illustrates examples of different lighting and images presented to an operator.

After capturing or acquiring a set of images via the image equipment, when the image acquisition module transmits these images of the part for inspection, the system may be configured to enhance images. For example, the system may enhance the image to highlight defects, via color enhancement, boundary or edge enhancement, suspect area highlights, or the like as illustrated in FIG. 9. As can be shown in FIG. 9, the operator can review the images and then select whether or not to Pass or Fail the part.

As illustrated in FIG. 9, in some cases, multiple images may be displayed to an operator. In some cases, these multiple images may have different image enhancements to aid in defect identification. For example, an operator may receive an original image and an enhanced image to highlight defects or an operator may receive two differently enhanced images (for example, one with a color enhancement and a second with a boundary or edge enhancement) or an operator may receive an original image with suspect areas highlighted to help focus the operator or the operator may receive images including any combination of the above.

In some embodiments, the system may be operated based on manual defect detection initially and then move towards or transform to an automated defect detection by providing/applying all or a subset of manual results to a machine learning algorithm to produce automated model sets with greater and greater confidence levels with regard to accuracy.

A machine learning approach generally makes use of inputs that have context associated with the inputs. In this case, the machine learning approach can work with the input images that have context associated with each image (i.e. the status of the result and other data/information) to develop image sets. The image sets that are created from the manual operator determinations may be used as input, sometimes referred to as a "labelled data set", that can be automatically fed into a machine learning system to 'teach' the approach as to which parts are good and should pass and which parts are bad and should fail, without having to program every alternative manually. In some cases, additional information regarding the reasons for pass or fail may be entered by the operator and may be reviewed for the machine learning approach. As the method and system described herein use a hybrid approach, the method and system provide for the collection of identified image sets, which lends itself to applying machine learning algorithms to potentially move towards a fully automated or almost fully automated solution. By providing test run results on a regular period based on regularly updated image sets, the progression towards a learned solution is natural within a machine learning environment. Managing the image sets and automated teaching and testing of the embodiments of the system and method detailed herein can be performed in an automated and regular cadence with reports to administrators based on the results. The administrators of the system may make the decision to employ a fully automated solution when the confidence level desired has been shown with demonstrated repeatability with live and representative image sets. In some cases, the confidence level may be intentionally/arbitrarily placed at a level to force additional operator review in order to generate additional data for machine learning purposes.

The machine learning in the present systems and methods may be implemented using, for example, OpenCV™ (Open Source Computer Vision Library), which is an open source computer vision and machine learning software library. Some commercial vendors also provide systems for deep learning-based image analysis.

Monitoring and management of performance based metrics as recorded by the system (i.e. response rates, accuracy rates, historical performance, etc.) may also be useful. For example, with image management and historical tracking capabilities, the saved data can be used for ongoing production processes, future planning, and the like, including training of new operators being introduced to the system. In this case, automated training and/or testing of operators using historical data can take place without the need for the part production machine or manufacturing operation to be operationally producing parts.

Advanced vision solutions such as the system described herein may enable manufacturers in different sectors to reconcile both competitive and regulatory concerns and new automated vision inspection systems may improve the efficiency of industrial machines to higher levels than conventional systems. However, it is noted that, despite developments in the machine vision industry, there may still be applications when the human eye is better than automated image analysis in defect detection and hybrid systems of the type described herein may be beneficial. For example, at the time of filing, some product inspections involving liquids in containers have been shown to benefit from manual review by a human.

Figure 10:
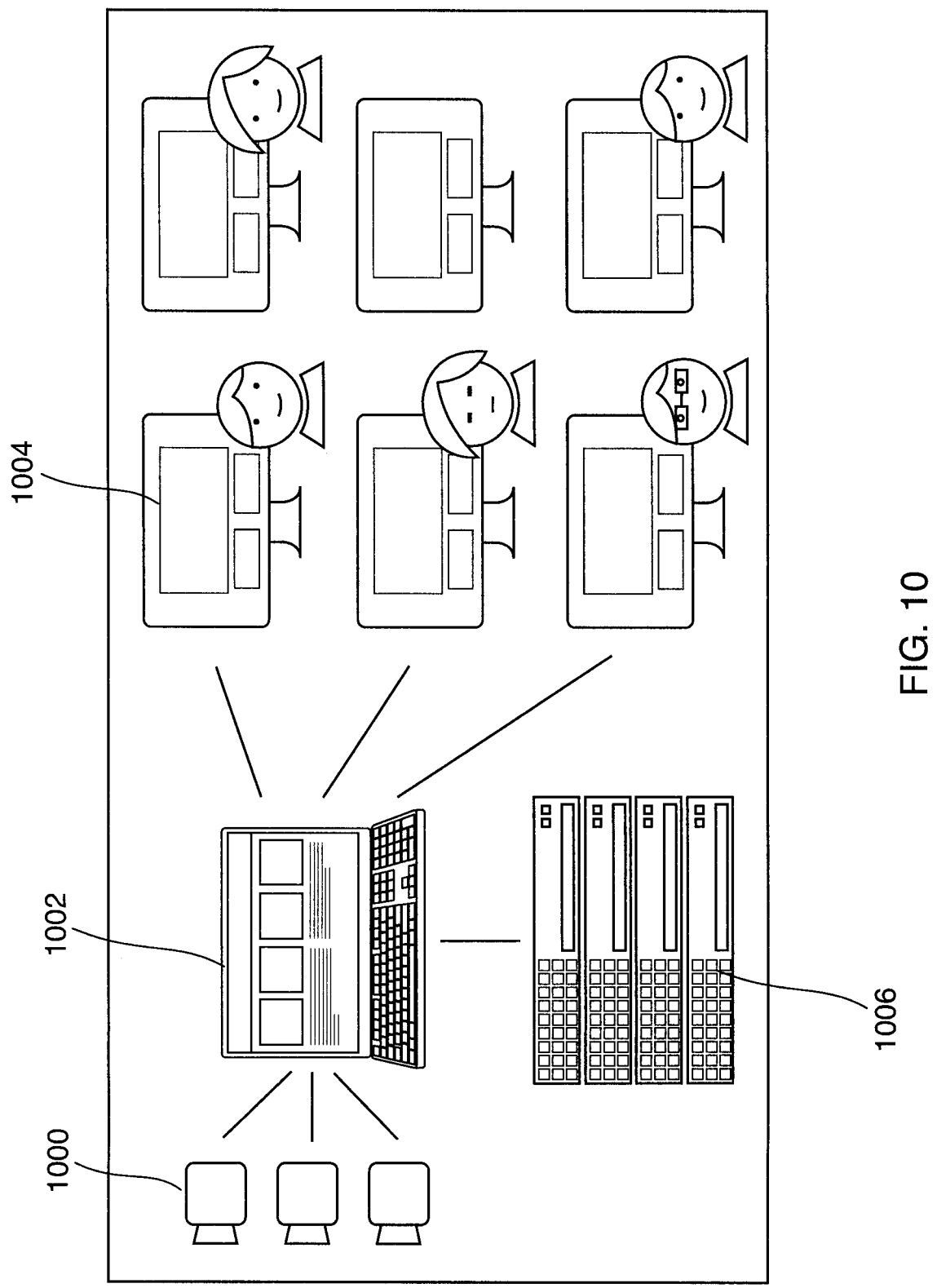
FIG. 10 illustrates an embodiment of a system for hybrid inspection.

In another example embodiment, as shown in FIG. 10, the system includes four main segments: an image acquisition segment 1000 for capturing image(s) from inspection targets, a processing computer 1002 for acquiring, storing and processing images, a multiple inspection display system 1004 for organizing and arranging display of the acquired images to operators and finally a database 1006 for storing and archiving images for future reference.

Figure 11:
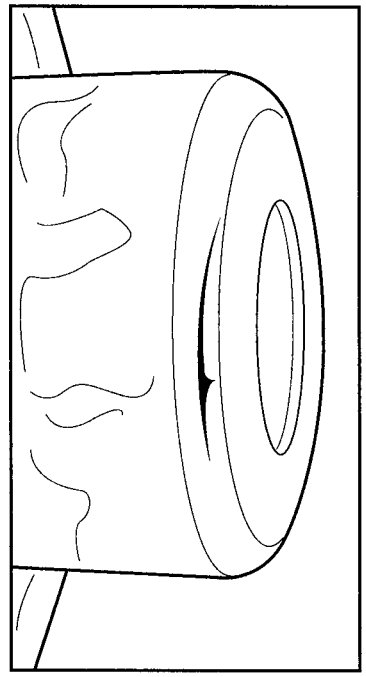
FIGS. 11 and 12 illustrate examples of image generation and enhancement provided by embodiments herein.
Figure 11:
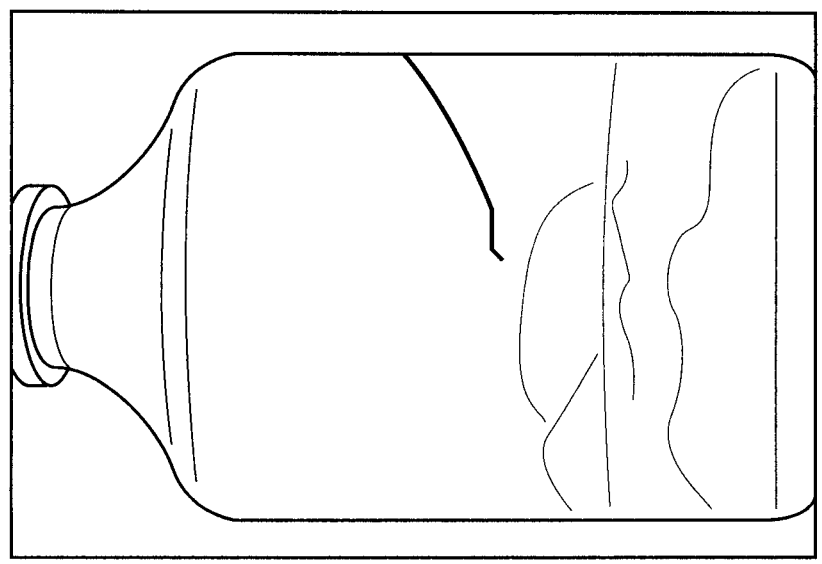
Figure 12:
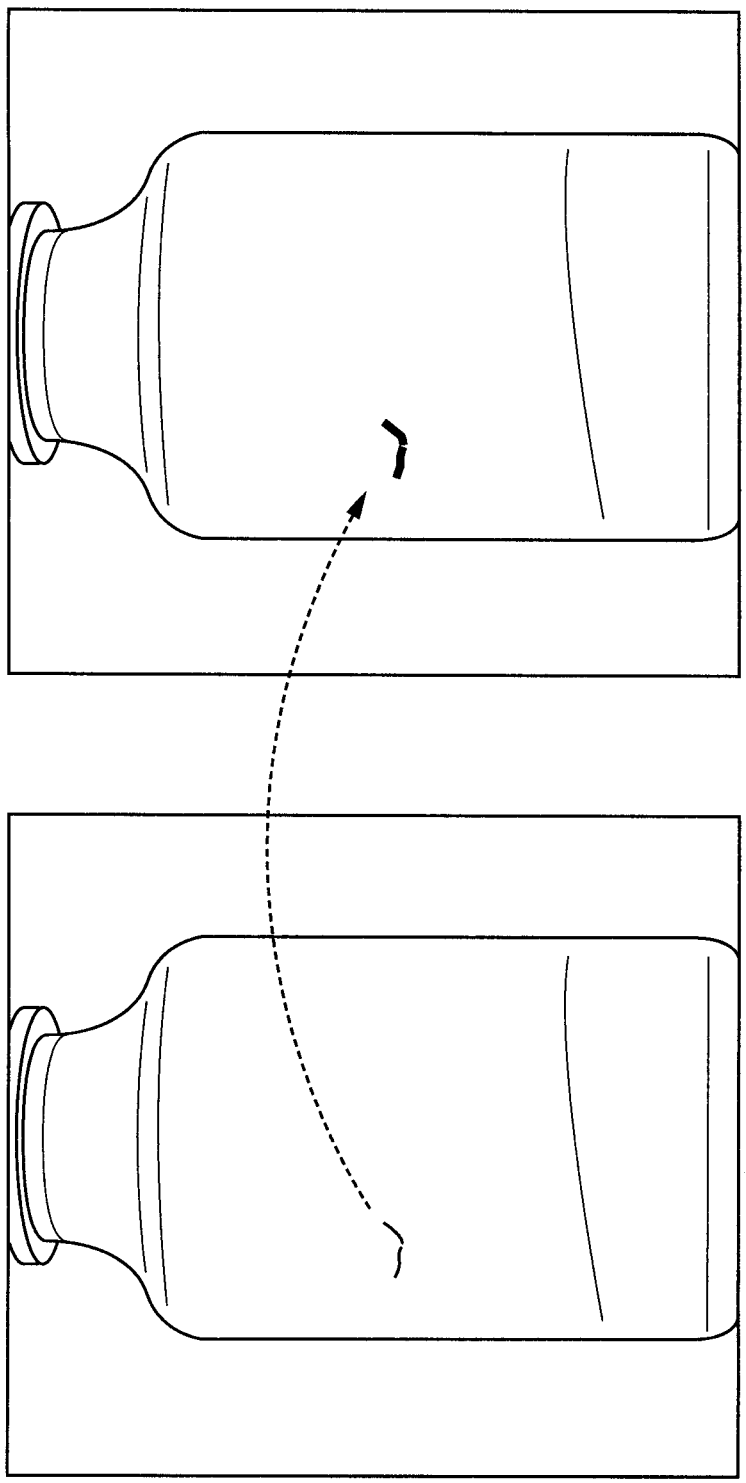

After an image has been acquired by a camera, the image may be transferred to the processing computer 1002. The processing computer 1002 tags and labels each image so the image can be tracked during the inspection process. The processing computer may perform some image processing in order to enhance defect detection in the images and transmits the resulting image (or images) to an active and available display within the inspection display system 1004 to be presented to an operator. In this example, there are multiple inspection displays. Examples of images that may be displayed to an operator are shown in FIGS. 11 and 12. In this example, an active display is a display that is ON and an operator has logged on to it, and an available display is a display where an operator is ready for accepting a new image for inspection.

The system may be capable of improving contrast and visibility of the objects of interest (for example, defects or key areas for inspection) in an inspection by using multiple cameras, lights, filters or the like for each inspection or for different images used in an inspection.

There may be some applications in which defects are so obvious the image may be rejected automatically by the system. Available image processing software tools may allow an administrator to program the processing computer 1002 such that it automatically detects gross defects and rejects the part without operator input or review. This capability can also make the system capable of highlighting defects to the operators for improved, easier and more efficient defect detection.

Embodiments of the system described herein can be highly flexible and programmable. Image enhancement features can make the system flexible so it can be added into any production line with minimal down time. Vision enhancement and inspection programs can be easily accessed and programmed by administrators.

One advantage of the system is that the system can be expandable. For example, the number of image equipment (for example, cameras) or displays can be easily increased. Similarly, the number of image acquisition modules, image enhancement modules and processors may also be increased from the arrangements shown in the figures. This may be beneficial when improved cycle times or higher accuracy is required for a manufacturing line. Image equipment including a higher number of cameras or displays will allow operators to have more time to review and inspect images and this may affect or improve the efficiency of the whole system.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. A method for inspecting a part in a manufacturing environment, the method comprising:
    acquiring at least two original images of the part, wherein the at least two original images are time lapsed;
    enhancing at least one of the at least two original images to generate at least one enhanced image;
    analyzing the at least one enhanced image to determine if the part has a potential defect;
    if it is determined that there is a potential defect:
        displaying at least two images including at least one enhanced image to an operator;
        collecting at least one metric associated with the at least two images, wherein the at least one metric is external to the part;
        receiving operator input of a part status, wherein the part status may be defect or no defect;
        assessing the part status by reviewing the at least one collected metric; and
        storing the part status in association with the at least two original images.

2. The method of claim 1 wherein analyzing the at least one enhanced image to determine if the part has a potential defect comprises:
    analyzing the at least one enhanced image for known indicators of a potential defect;
    determining a confidence level associated with the analysis; and
    if the confidence level does not meet a predetermined threshold, determine that there is a potential defect, otherwise determine that there is no potential defect.

3. The method of claim 2 wherein determining a confidence level comprises:
    reviewing previously stored part status results and associated previously stored images;
    determining whether the at least two original images or at least one enhanced image exhibits similar characteristics to the previously stored images that have a status of defect; and
    determining the confidence level based on a measure of how well the characteristics of the previously stored images that have a status of defect match to characteristics of the at least one image.

4. The method of claim 1 further comprising:
if it is determined that there is not a potential defect, further enhancing the at least two original images and repeating the analysis.

5. The method of claim 1 wherein analyzing the at least one enhanced image to determine if the part has a potential defect comprises:
applying machine learning to previous images and previous part status results associated with the previous images.

6. The method of claim 1 wherein the acquiring at least two original images of a part comprises:
acquiring a plurality of original images of a part.

7. The method of claim 6 wherein each of the plurality of original images comprises an image taken from a different vantage point.

8. The method of claim 6 wherein enhancing the plurality of original images comprises enhancing each of the plurality of original images using a different enhancement method or a plurality of enhancement methods.

9. The method of claim 1 wherein the time-lapsed images are superimposed to create a single image.

10. The method of claim 1 wherein displaying the at least two images to an operator comprises:
transmitting the at least two images via a network to a remote location; and
displaying the at least two images to the operator on a computing device at the remote location.

11. The method of claim 1 wherein the operator comprises a plurality of operators and the displaying the at least two images to an operator comprises displaying the at least two images to more than one of the plurality of operators.

12. The method of claim 1 wherein storing the part status in association with the at least one original image further comprises storing information related to the operator in association with the part status and the at least one original image.

13. The method of claim 12 further comprising analyzing performance of the operator based on the stored part status, at least one original image data and information related to the operator.

14. The method of claim 1 wherein the at least one metric is selected from the group comprising: operator identification, date and time of image acquisition, date and time of operator viewing, batch information, camera identification, measured light levels of the image and image processing time.

15. The method of claim 1 further comprising:
retrieving the previously stored operator's results;
comparing the previously stored operator's results with the assessed part status; and
evaluating the operator based on the comparison of the operator's results to the assessed part status and on the at least one metric external to the part.

16. A system for inspecting a part in a manufacturing environment, the system comprising:
image equipment for acquiring at least two original images of the part, wherein the at least two images are time lapsed;
an input/output system for selectively displaying the at least two images to an operator and for receiving operator input;
a storage module for storing the at least two original images and data related to the at least two original images and the operator; and
a processor for:
analyzing the at least two original images received by the image equipment to determine if the part has a potential defect and, if it is determined that there is a potential defect, setting a part status to defect and selectively displaying the at least two original images to the operator via the input/output system;
if the processor selectively displays the at least two original images to the operator, collecting at least one metric associated with the at least two original images, wherein the at least one metric is external to the part, receiving operator input of a part status, wherein the part status may be defect or no defect; and if the operator input is no defect, setting the part status to no defect, and assessing the part status by reviewing the at least one collected metric; and
storing the part status in association with at least two original images and data related to the operator in the database.

17. The system of claim 16 wherein the selectively displaying the at least two original images to the operator comprises:
analyzing the at least two original images for known indicators of a potential defect;
determining a confidence level associated with the analysis; and
if the confidence level does not meet a predetermined threshold displaying the at least two original images to the operator.

18. The system of claim 16, wherein the at least one metric is selected from the group comprising: operator identification, date and time of image acquisition, date and time of operator viewing, batch information, camera identification, measured light levels of the image and image processing time.

19. A method of combined automatic and manual inspection of a part comprising:
obtaining at least two images of the part to be inspected, wherein the at least two images are time-lapsed;
collecting at least one metric associated with at least two images, wherein the at least one metric is external to the part;
enhancing at least one of the at least two images of the part to be inspected;
automatically analyzing the at least one enhanced image to determine an automatic status result;
displaying the at least two images to an operator to determine a manual status result; and
determining a status of the part based on at least one of the automatic status result and the manual status result; and
assessing the status of the part based on the at least one collected metric.

20. The method of claim 19 further comprising, before displaying the at least one image:
transferring the images to a remote location to be displayed to the operator.

* * * * *